(12) United States Patent
Law (10) Patent No.: US 7,898,213 B2
(45) Date of Patent: Mar. 1, 2011

(54) MULTI-BATTERY CHARGER (76) Inventor: Hung Hi Law, Hong Kong (HK)

( * ) Notice: Subject to any disclaimer, the term of this patent is extended or adjusted under 35 U.S.C. 154(b) by 871 days.

(21) Appl. No.: 11/773,961

(22) Filed: Jul. 6, 2007

(65) Prior Publication Data
US 2008/0067975 A1 Mar. 20, 2008

(30) Foreign Application Priority Data

Sep. 18, 2006 (CN) .......................... 2006 1 0127395

(51) Int. Cl.
*H02J 7/00* (2006.01)
(52) U.S. Cl. ............................. 320/107; 320/110; 429/1
(58) Field of Classification Search .................. 320/107, 320/110; 429/1
See application file for complete search history.

(56) References Cited

U.S. PATENT DOCUMENTS 5,780,991 A * 7/1998 Brake et al. ................... 320/112
6,610,941 B2 * 8/2003 Pfeiffer ................. 200/61.58 R

* cited by examiner

*Primary Examiner* — Edward Tso
*Assistant Examiner* — Samuel Berhanu
(74) *Attorney, Agent, or Firm* — Tsz Lung Yeung (57) ABSTRACT A multi-battery charger for at least one rechargeable battery includes a charger case, and a multi-battery charging module. The charger case includes a plurality of electrically neutral charging terminals spacedly provided thereon, and an electric input terminal adapted for electrically connecting with an external DC power source. The multi-battery charging module is provided in the charger case to electrically communicate with the charging terminals, and includes a recharging circuitry and a polarity detection circuitry. The polarity detection circuitry is electrically connected with the recharging circuitry to accurately detect a positive polarity and a negative polarity of the first and the second battery terminal when the first and the second battery terminals are electrically connected with two of the charging terminals, in such a manner that when a correct polarity of the first and the second battery terminals is determined, the recharging circuitry is activated to properly recharge the rechargeable battery.

16 Claims, 7 Drawing Sheets

MULTI-BATTERY CHARGER

BACKGROUND OF THE PRESENT INVENTION

1. Field of Invention

The present invention relates to a charger, and more particularly to a multi-battery charger which is capable of charging battery of different sizes, and irrespective of polarity of the battery terminals.

2. Description of Related Arts

A conventional charger, such as a conventional battery charger for a cellular phone battery, usually comprises a charger case having a battery slot formed thereon, a positive charging pin and a negative charging pin spacedly provided within the battery slot for aligning with a battery terminal and a negative battery terminal of the battery respectively, and a charging circuitry provided within the charger case to electrically connect with the positive charging pin and the negative charging pin. When the battery is is placed properly within the battery slot, the charging circuitry can be activated to start charging of the battery through the positive charging pin and the negative charging pin.

There exist several disadvantages for this type of conventional charger. First, in order to properly charge the a conventional rechargeable battery, a user must insert the battery into the battery slot and ensure that the positive charging pin and the negative charging pin of the conventional charger align with the positive battery terminal and the negative battery terminal of the rechargeable battery respectively. This presents an inconvenience charging practice to users of cellular phones and creates a potentially dangerous scenario when the users accidentally or carelessly put the rechargeable battery into the charging slot in reverse polarity. In such a case, the rechargeable battery may not be properly recharged, and in the worst scenario, the rechargeable battery may even have the possibility of having explosion.

Second, almost all conventional chargers have been specifically designed to recharge only one particular type or model of rechargeable batteries. For example, a charger of a particular rechargeable battery designed for use in a particular model or particular brand of cellular phones may only be utilized for charging that particular type of rechargeable battery. This may be accomplished in a number of ways. Mechanically, the battery slot of the charger may be specifically crafted and designed to fit only one type of batteries. Rechargeable batteries of other types simply cannot be inserted into the battery slot for electrically connecting the battery terminals with the charging pins. Electronically, the charging circuitry of the conventional charger may be specifically designed and engineered to charge rechargeable batteries which only possess certain charging parameters. Thus, when a user possesses several cellular phones, he or she may need to get the corresponding number of battery chargers in order to recharge all of their batteries. This presents an undue inconvenience to cellular phone users.

As a matter of fact, there exists an improved charger which has a plurality of battery slots formed on the charger case for charging batteries of different sizes and capacities. The charging circuitry is also electronically designed to charge more than one battery simultaneously. However, the main problem of this type of battery charger is that each particular battery slot is usually designed for charging a particular type of battery having a particular capacity. Thus although this type of battery charger mitigates some of the disadvantages mentioned above, it does not resolve the relevant problems acceptably because it does not address the core nature of the problem, i.e. the inherent inflexible nature of conventional chargers. Thus, when a battery of unmatched capacity is put into one particular battery slot, either the rechargeable battery or the charging circuitry may be severely damaged.

SUMMARY OF THE PRESENT INVENTION

A main object of the present invention is to provide a multi-battery charger which is capable of charging battery of different sizes, and irrespective of polarity of the battery terminals. In other words, the multi-battery charger of the present invention is universal in the sense that it is adapted to charge a wide variety of different kinds of rechargeable batteries in an extremely convenient manner.

Another object of the present invention is to provide a multi-battery charger comprising a multi-battery charging module adapted to accurately and effectively detect the correct polarity of a rechargeable battery which is electrically contacting with the multi-battery charger without damaging either the multi-battery charger or the rechargeable battery. Thus, the present invention ensures that the charging process is safe and non-destructive to any electrical devices involved.

Another object of the present invention is to provide a multi-battery charger which is adapted to effectively and efficiently recharge a wide variety of rechargeable batteries without needing to affect conventional electrical and physical structure of the rechargeable batteries so as to promote extensive application of the present invention.

Accordingly, in order to accomplish the above objects, the present invention provides a multi-battery charger for at least one rechargeable battery having a first and a second battery terminal, comprising:

a charger case comprising a plurality of electrically neutral charging terminals spacedly provided thereon, and an electric input terminal adapted for electrically connecting with an external DC power source; and a multi-battery charging module, which is provided in the charger case to electrically communicate with the charging terminals, and comprises:

a recharging circuitry having a positive recharge terminal and a negative recharge terminal adapted for electrically connecting with the battery terminals in correct polarity through the charging terminals for properly recharging the rechargeable battery; and a polarity detection circuitry electrically connected with the recharging circuitry to accurately detect a positive polarity and a negative polarity of the first and the second battery terminal when the first and the second battery terminals are electrically connected with two of the charging terminals, in such a manner that when a correct polarity of the first and the second battery terminals is determined, the recharging circuitry is activated to properly recharge the rechargeable battery.

Moreover, the present invention also provides a method of charging a rechargeable battery by a multi-battery charger comprising a plurality of charging terminals, a recharging circuitry, and a central processing module, wherein the rechargeable battery has a first and a second battery terminal but unknown polarity, wherein the method comprises the steps of:

(a) electrically connecting one of the charging terminals and another of the charging terminals with the first battery terminal and the second battery terminal respectively, wherein the charging terminal electrically which connects to the first battery terminal is defined as a reference charging terminal, and the charging terminal which electrically connects to the another of the charging terminals is defined as a tester charging terminal;

(b) electrically connecting the reference charging terminal with a negative terminal of the recharging circuitry;

(c) electrically connecting the tester charging terminal with a positive Is terminal for the recharging circuitry;

(d) starting a tester charging process by the central processing module for acquiring a recharging voltage pattern;

(e) comparing the recharging voltage pattern with a reference voltage pattern; and (f) starting a substantive recharge process when the recharging voltage pattern substantially resembles the reference voltage pattern so as to fully recharge the rechargeable battery by the recharging circuitry; and (g) electrically re-connecting the charging terminals with the recharging circuitry when the recharging voltage pattern departs substantially from the reference voltage pattern.

These and other objectives, features, and advantages of the present invention will become apparent from the following detailed description, the accompanying drawings, and the appended claims.

DETAILED DESCRIPTION OF THE PREFERRED EMBODIMENT

Referring to FIG. 1 to FIG. 3, FIG. 4A to FIG. 4F of the drawings, a multi-battery charger according to a preferred embodiment of the present invention is illustrated, in which the multi-battery charger comprises a charger case 100, and a multi-battery charging module. The multi-battery charger is for charging at least one rechargeable battery, such as a rechargeable battery for a conventional cellular phone, and has a first and a second battery terminal.

Figure 1:
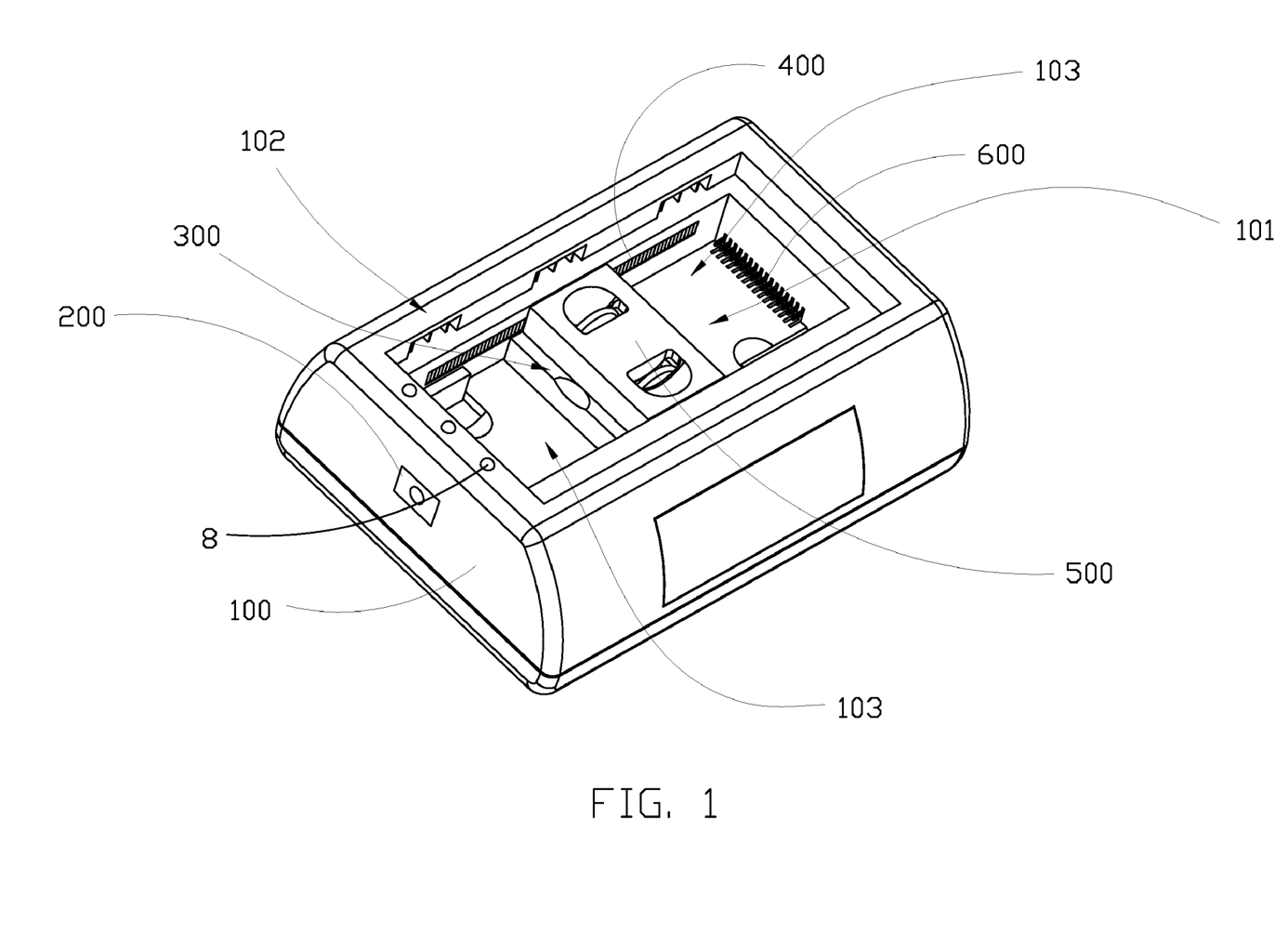
FIG. 1 is a perspective view of a multi-battery charger according to a preferred embodiment of the present invention.

The charger case 100 comprises a plurality of electrically neutral charging terminals 600 spacedly provided thereon as multi-contact terminals of the charger case 100, and an electric input terminal 200 adapted for electrically connecting with an external DC power source.

Figure 2:
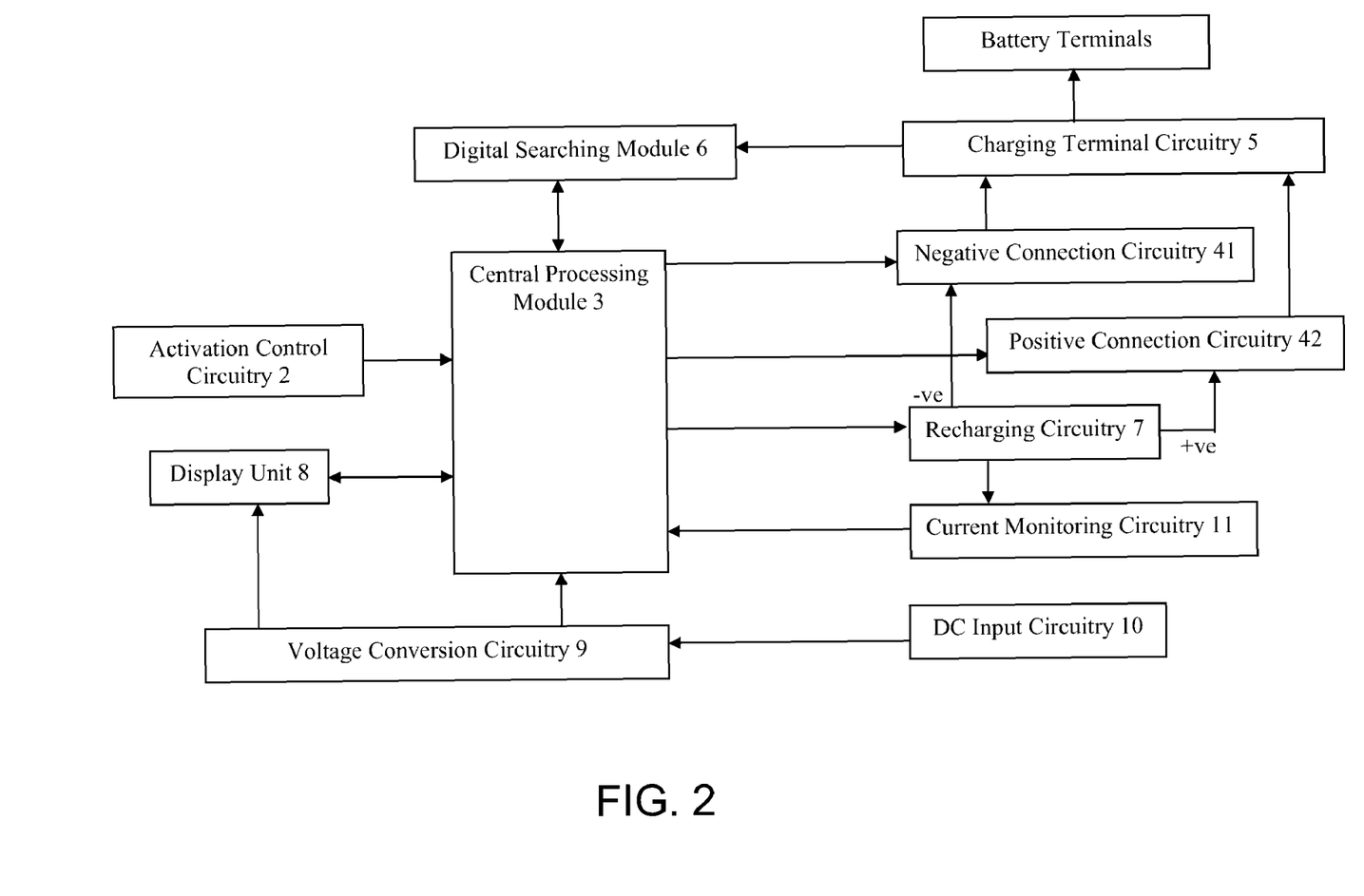
FIG. 2 is a schematic diagram of the multi-battery charging module of the multi-battery charger according to the preferred embodiment of the present invention.

The multi-battery charging module is provided in the charger case 100 to electrically communicate with the charging terminals 600, and comprises a recharging circuitry 7 and a polarity detection circuitry. The recharging circuitry 7 has a positive recharge terminal and a negative recharge terminal adapted for electrically connecting with the battery terminals in correct polarity through the charging terminals 600 for properly recharging the rechargeable battery.

The polarity detection circuitry is electrically connected with the recharging circuitry 7 to accurately detect a positive polarity and a negative polarity of the first and the second battery terminal when the first and the second battery terminals are electrically connected with two of the charging terminals 600 respectively, in such a manner that when a correct polarity of the first and the second battery terminals is determined, the recharging circuitry 7 is activated to properly recharge the rechargeable battery. Moreover, the polarity detection circuitry further comprises a central processing module 3 and a terminal rerouting circuitry.

The recharging circuitry 7 has a positive recharge terminal and a negative recharge terminal adapted for electrically connecting to the first battery terminal and the second battery terminal for recharging the battery, in such a manner that when the battery is properly recharged, a potential difference between the positive recharge terminal and the negative recharge terminal follows a predetermined reference voltage pattern. Moreover, the central processing module 3 is electrically communicated with the recharging circuitry 7 to control and monitor an operation thereof.

The terminal rerouting circuitry is electrically communicating between the recharging circuitry 7 and the central processing module 3, in such a manner that when the first and the second battery terminals are electrically connected with the charging terminals 600 of the charger case 100, the terminal rerouting circuitry electrically connects one of the charging terminals 600 to the negative recharge terminal of the recharging circuitry 7, and another of the charging terminals 600 to the positive recharge terminal of the recharging circuitry 7 for attempting recharging of the battery by the recharging circuitry 7 and producing a recharging voltage pattern between the positive and the negative recharging terminal of the recharging circuitry 7, wherein when the recharging voltage pattern substantially departs from the predetermined reference voltage pattern, the terminal rerouting circuitry is electrically controlled by the central processing module 3 to electrically reconnect the charging terminals 600 with the negative and the positive recharge terminals of the recharging circuitry 7, until the predetermined reference voltage pattern occurs in the recharging circuitry 7 as the recharging voltage pattern, so as to ensure that the battery is properly recharged in correct polarity.

According to the preferred embodiment of the present invention, the charger case 100 further has a receiving cavity 101 indently formed therein, and a top opening 102 communicating the receiving cavity 101 with an exterior of the charger case 100. As shown in FIG. 1 of the drawings, the charger case 100 further has a plurality of sliding tracks 400 formed two longitudinal inner side surface of the receiving cavity 101, and comprises an adjustment slider 500 slidably coupled with the sliding tracks 400 in the receiving cavity 101 to divide the receiving cavity 101 into a plurality of battery compartments 103 for receiving at least one rechargeable battery therein, wherein the charging terminals 600 are spacedly provided within the battery compartments 103 to electrically connect with the terminal rerouting circuitry. The charging terminals 600 are spacedly mounted at predetermined positions within the battery compartments 103 to substantially align with the battery terminals of the rechargeable battery. In this preferred embodiment of the present invention, the charger case 100 comprises sixteen charging terminals 600 each of which is spaced apart from an adjacent charging terminal 600 by a predetermined distance of 1 mm. It is important to point out, however, that the number of charging terminals 600 and the distance between each two adjacent charging terminals 600 may be varied to fit the different circumstances in which the present invention is to be actually utilized.

It is worth mentioning that the charger case 100 is adapted to recharge a wide variety of rechargeable batteries. Thus, the adjustment slider 500 has a plurality of L-shaped retention shoulders 300 formed on two top corner portions thereof respectively for facilitating fit accommodation of the rechargeable battery into the corresponding battery compartment 103. In other words, the adjustment slider 500 is adapted slidably to move along the sliding tracks 400 to fittedly adjust a size and shape of the corresponding battery compartment 103 such that the rechargeable battery is capable of being fittedly received in that battery compartment 103. Accordingly, a user of the present invention is able to slide the adjustment slider 500 along the sliding tracks 400 so as to adjust the size of the battery compartment for fittedly receiving his or her rechargeable battery.

In order to allow the user to monitor the entire charging process of the rechargeable battery, the charger case 100 further comprises a display unit 8 provided thereon and electrically connected with the multi-battery charging module for displaying a charging status of the rechargeable battery. The display unit 8 may be embodied as a LCD display unit for graphically displaying the charging status by texts or simple figures. Alternatively, the display unit 8 can also be embodied as at least one LED for indicating the charging status by controlled illumination thereof, as shown in FIG. 1 of the drawings.

Figure 3:
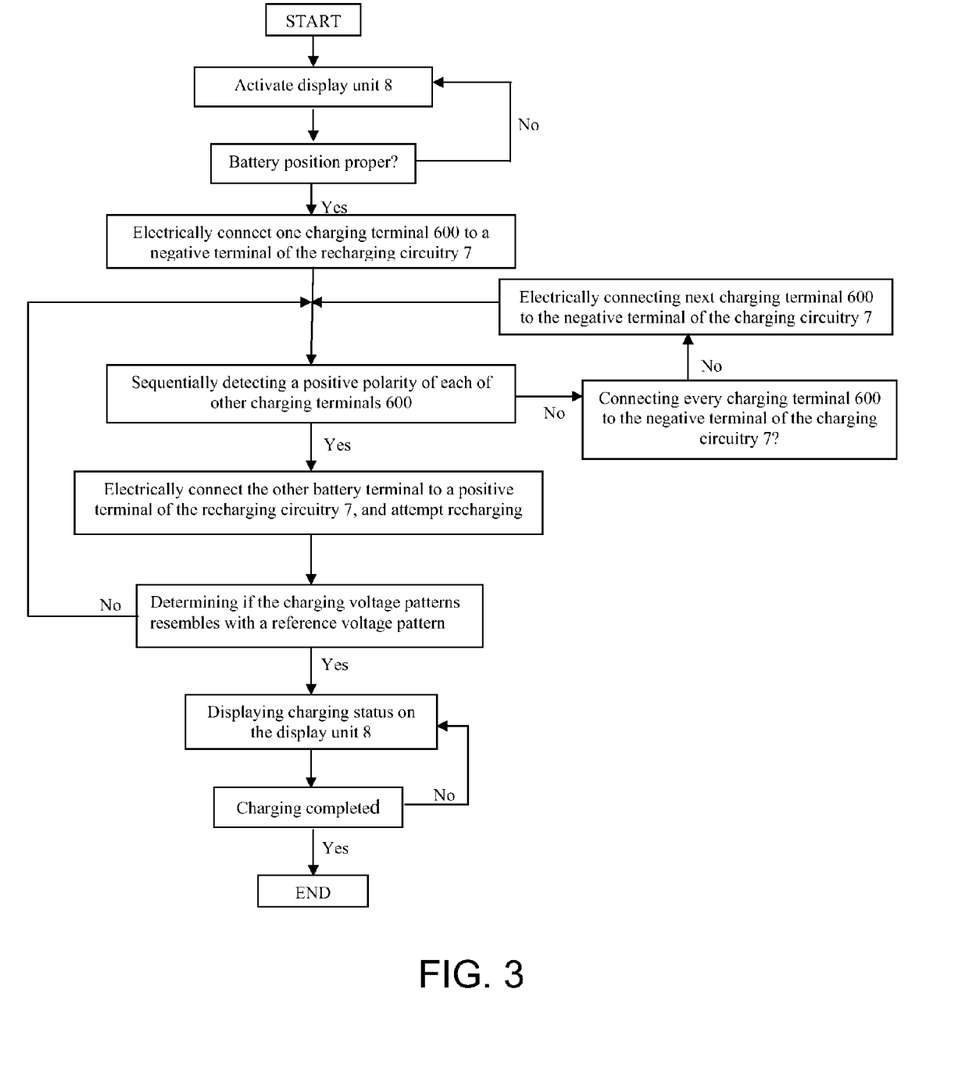
FIG. 3 is a flow diagram of the multi-battery charging module of the multi-battery charger according to the preferred embodiment of the present invention.
Figure 4A:
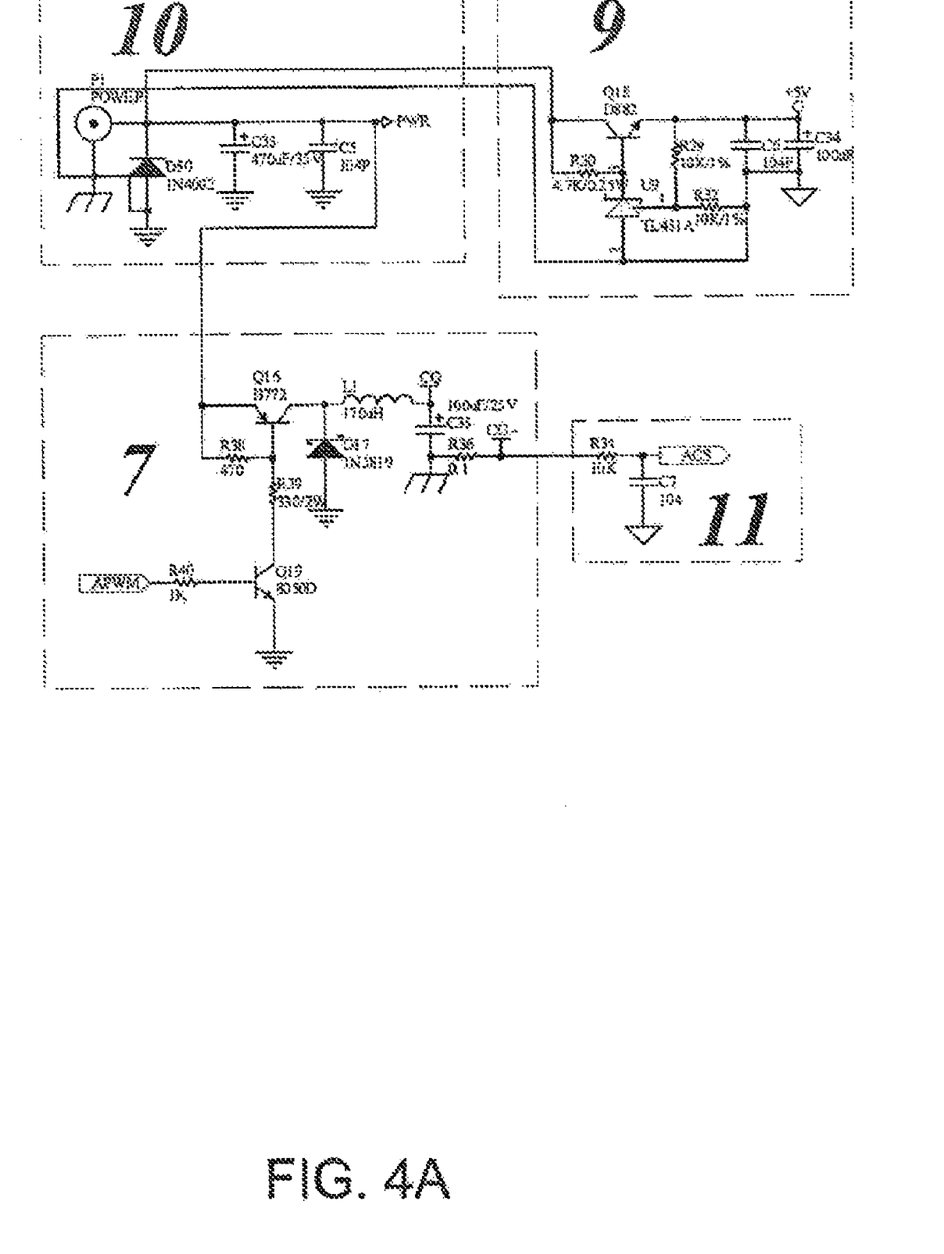
FIG. 4A to FIG. 4F are circuit diagrams of the multi-battery charging charger according to the preferred embodiment of the present invention.
Figures 4B, 4E, 4F:
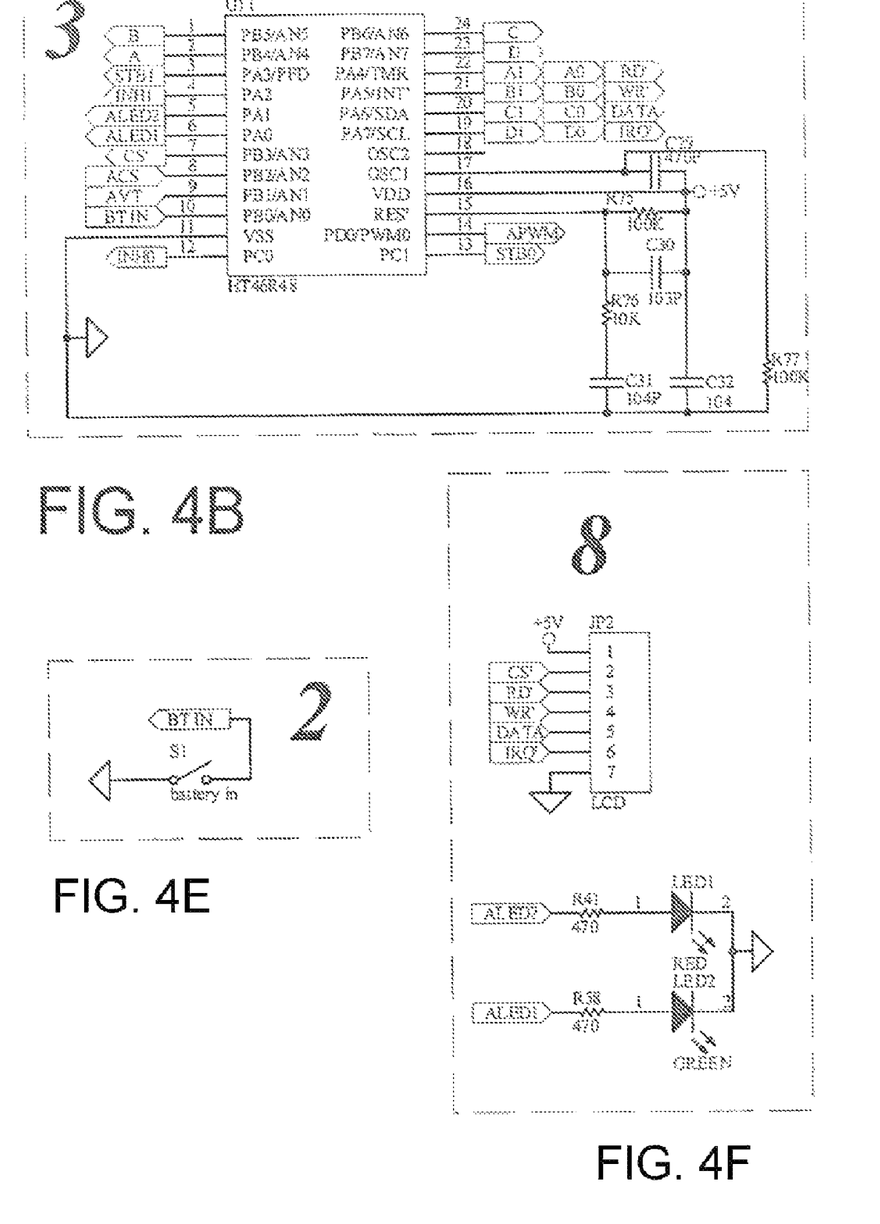
Figure 4C:
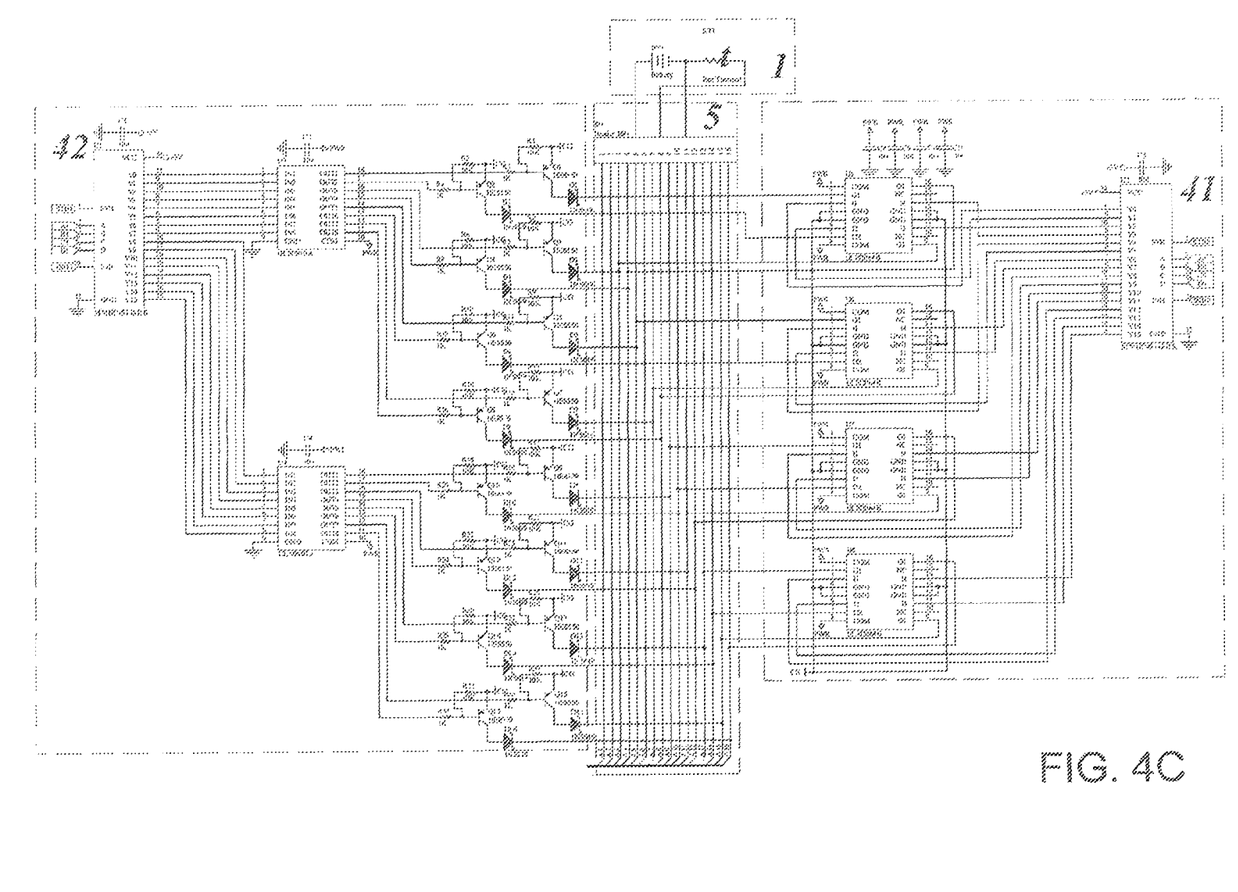
Figure 4D:
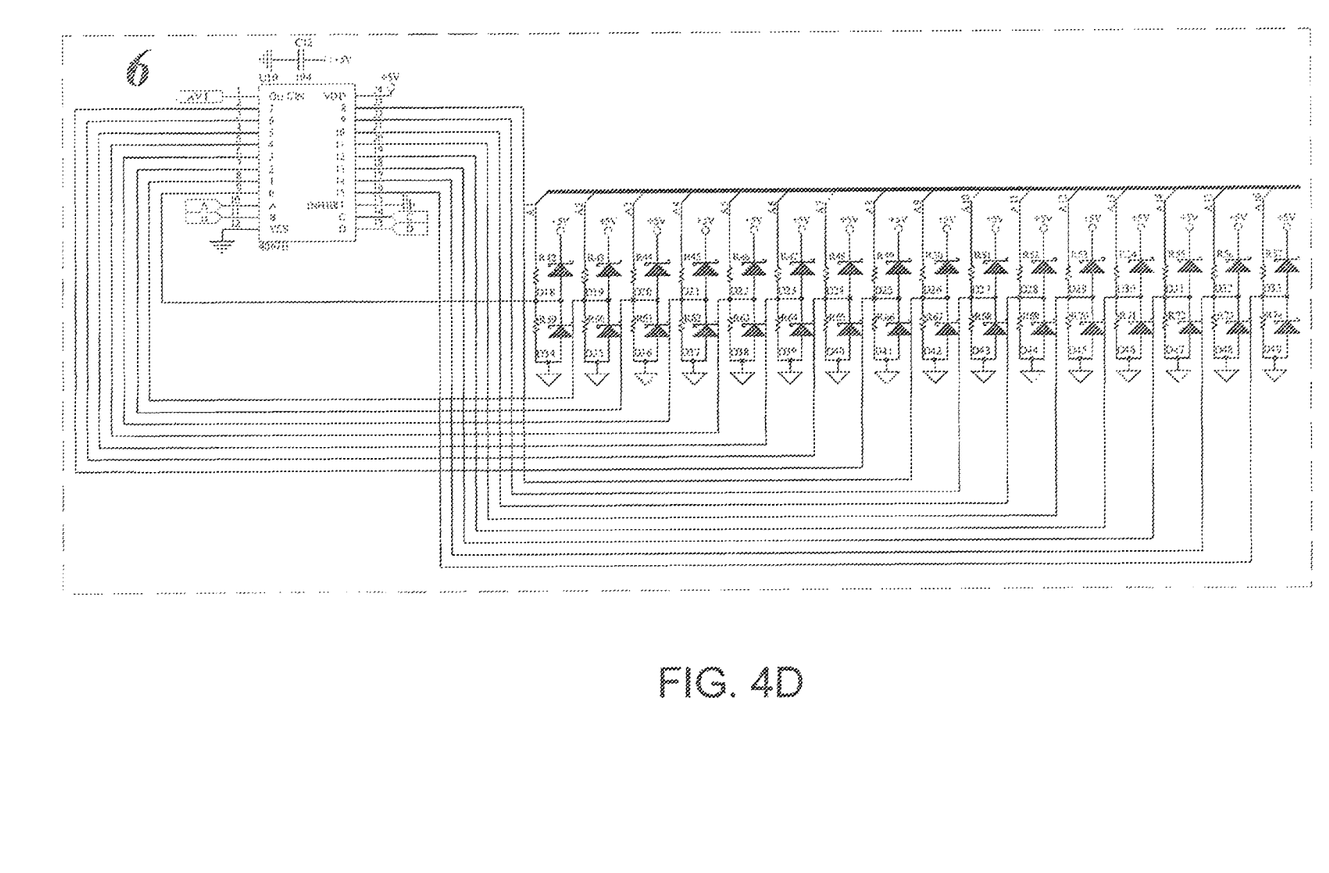

Referring to FIG. 2 to FIG. 3 of the drawings, the multi-battery charging module further comprises a DC input circuitry 10 electrically connecting with the electric input terminal 200 of the charger case 100, a voltage conversion circuitry 9 electrically connected with the DC input circuitry 10 and the central processing module 3, a charging terminals circuitry 5 electrically connected to the charging terminals 600 of the charger case 100, an activation control circuitry 2 electrically connected to the central processing module 3 for detecting presence of the rechargeable battery and activating the central processing module 3 when the rechargeable battery is electrically connecting with the charging terminals 600. The activation control circuitry 2 is preferably operated through a mechanical switch or a light-sensitive switch.

The multi-battery charging module further comprises a digital searching module 6 electrically connected with the central process circuitry 3 and the charging terminals circuitry 5, and a current monitoring circuitry 11 electrically connected with a negative terminal of the recharging circuitry 7 and the central processing unit 3 through a regular R-C circuit for detecting a charging current of the rechargeable battery when it is being recharged by the recharging circuitry 7. Moreover, the terminal rerouting circuitry comprises a negative connection circuitry 41 electrically connected with the charging terminals circuitry 5 and the central processing module 3, and a positive connection circuitry 42 electrically connected with the charging terminals circuitry 5 and the central processing module 3. Referring to FIG. 2 of the drawings, the negative terminal of the recharging circuitry 7 is electrically connected to the negative connection circuitry 41, while a positive terminal of the recharging circuitry 7 is electrically connected with the positive connection circuitry 42 and the DC input circuitry 10.

According to the preferred embodiment of the present invention, when the multi-battery charger of the present invention is electrically connected with an external DC power source, the DC input circuitry 10 is arranged transmit the DC to the recharging circuitry 7 and the voltage conversion circuitry 9. The voltage conversion circuitry 9 is arranged to convert the voltage of the transformed DC into a predetermined voltage for use by the central processing module 3 and the display unit 8. In other words, the voltage conversion circuitry 9 supplies the necessary electricity at the predetermined voltage to the display unit 8, and the central process circuitry 3 which then electrically activates and controls other circuitries within the multi-battery charging module.

Referring to FIG. 3 of the drawings, the operation of the present invention is as follows: first, a user has to fittedly dispose a rechargeable battery having two battery terminals (one of them is positive and another is negative) into one of the battery compartments 103 so that the two battery terminals electrically connects with at least one of the charging terminals 600. Then the user should electrically connect the electric input terminal 200 to an external DC power source. The externally acquired DC is divided and transmitted to the recharging circuitry 7 and the voltage conversion circuitry 9 which then further converts the externally acquired DC into the predetermined voltage and transmits the converted DC voltage to the central processing module 3 and the display unit 8 for supplying adequate electrical power to activate them. When the battery terminals of the rechargeable battery electrically connect with at least one of the charging terminals 600, the activation control circuitry 2 is activated to activate a polarity detection process which is to be coordinated by the central processing module 3.

When the central processing module 3 is electrically activated to carry out the polarity detection process, the central processing module 3 will first drives the negative connection circuitry 41 to electrically connect the negative terminal of the recharging circuitry 7 with one of the charging terminals 600 (first charging terminal 600) which is electrically connecting with one of the battery terminals. The central processing module 3 will then activate the digital searching module 6 to search and detect for a positive polarity among other charging terminals 600 which have not been electrically connected to the negative terminal of the recharging circuitry 7. Suppose that one of the other charging terminals 600 (second charging terminal 600) is electrically connected to the positive battery terminal of the rechargeable battery, the digital searching module 6 is arranged to send a feedback signal back to the central process module 3 which then drives the positive connection circuitry 42 to electrically connect the second charging terminals 600 with the positive terminal of the recharging circuitry 7.

After the positive terminal and the negative terminal of the recharging circuitry 7 have been electrically connected to the two charging terminals 600 respectively (the first and the second charging terminals 600 respectively), the central processing module 3 signals the recharging circuitry 7 to start the tester charging process. At the same time, the central processing module 3 also activates the current monitoring circuitry 11 to detect a charging current and the voltage change of the rechargeable battery. When the rechargeable battery is being properly recharged, i.e. when the positive battery terminal is electrically connected with the positive charging terminal 600 (second charging terminal 600) and the negative battery terminal is electrically connected with the negative charging terminal 600 (the first charging terminal 600), a recharging voltage pattern (a first recharging voltage pattern) representing a change of battery voltage with respect to charging current will be obtained. It is expected that a gradual increase of the battery voltage will be observed if the rechargeable battery is being recharged properly, and this is the predetermined reference voltage pattern. If the actual recharging voltage pattern follows this trend (the predetermined reference voltage pattern), i.e. gradual increase in the battery voltage over time, the central processing module 3 is programmed to positively recognize the recharging voltage pattern as being proper. The substantive charging process will now be actually started for fully recharging the rechargeable battery.

However, when the recharging voltage pattern departs substantially from the reference voltage pattern, this means the rechargeable battery is not properly charged. The central processing module 3 then drive the positive connection circuitry 42 to electrically disconnect the charging terminal 600 (the second charging terminal 600) electrically connecting with the positive terminal of the recharging circuitry 7 and electrically reconnects the positive terminal of the recharging circuitry 7 with another charging terminal 600 (third charging terminal 600). When the first and the third charging terminals 600 are electrically connected with the negative and the positive terminal of the recharging circuitry 7 respectively, a second recharging voltage pattern will be obtained which and compared with the predetermined reference recharging voltage pattern. If this second recharging voltage pattern follows the reference recharging voltage pattern, the central processing module 3 is programmed to positively recognize the second recharging voltage pattern as being proper. The charging process will now be continued until the rechargeable battery is fully charged. However, when the second recharging voltage pattern departs substantially from the reference voltage pattern, this means the rechargeable battery is also not properly charged. The above process continues with the second charging terminal 600 being replaced by a third charging terminal 600 of the charger case 100, and stops when the recharging voltage pattern substantially resembles the reference recharging voltage pattern.

When all the charging terminals have been tested but no desired recharging voltage pattern is obtained, the central processing module 3 will then drive the negative connection circuitry 41 to electrically re-connect the negative terminal of the recharging circuitry 7 with one of the charging terminals 600 except the first charging terminal 600. Moreover, the central processing module 3 will then drive the positive connection circuitry 42 to electrically re-connect the positive terminal of the charging circuitry 7 with the first charging terminal 600 for obtaining the recharging voltage pattern. The recharging voltage pattern will then be compared with the reference recharging voltage for the purpose as described above. The above process continues until the recharging voltage pattern resembles the reference recharging voltage pattern. At that time, the substantive charging process will be initialed by the central processing module 3.

When all of the charging terminals 600 have been electrically connected in the above manner but no desired recharging voltage pattern is obtained, the central processing module 3 will drive the display unit 8 to display an error message thereon. The error message may inform the user that the rechargeable battery is not properly disposed into the charging case 100.

On the other hand, when the recharging voltage pattern substantially resembles to the reference recharging voltage pattern, it signals that the rechargeable battery is electrically connected with the multi-battery charger of the present invention with correct polarity. The central processing module 3 is arranged to initiate the substantive recharging process of the present invention.

More specifically, when the central processing module 3 initiates the substantive recharging process, it is arranged to send a Pulse-Width Modulation (PWM) signal to the recharging circuitry 7 for driving it to recharge the rechargeable battery at a predetermined charging current which is monitored by the current monitoring circuitry 11. In order to prevent overcharging of the rechargeable battery, the central processing module 3 must be able to obtain a real-time recharging voltage of the rechargeable battery. This can be accomplished by the following manner: the central processing module 3 will first drives the digital searching module 6 to electrically connect with the positive terminal of the rechargeable battery as detected to obtain real-time positive charging voltage, and then electrically connect with the negative terminal of the rechargeable battery as detected to obtain a real-time negative charging voltage. The real-time recharging voltage of the rechargeable battery is then obtained by subtracting the real-time positive charging voltage from the real-time negative charging voltage.

According to the preferred embodiment of the present invention, the rechargeable battery is preferably embodied as a conventional lithium-ion battery with the maximum capacity being conventionally set at 0.1 ampere-hour (Ah). When the rechargeable battery is being recharged, the charging current as detected by the current monitoring circuitry 11 will become smaller and smaller and the recharging voltage will increase over time The charging current eventually becomes stabilized and reaches a predetermined constant current. When the real-time recharging voltage reaches a predetermined threshold which is substantially the same as the maximum capacity of the rechargeable battery, constant-voltage charging occurs and the charging current will drop and eventually reach the predetermined constant current. For the multi-battery charger of the present invention, this constant current is conventionally set at 50 mA, so that when the current monitoring circuitry 11 detects that the charging current stabilizes at around 50 mA, the central processing circuitry 3 is pre-programmed to stop the substantive recharging process.

A preferred example of the major parameters of the recharging process is as follows: suppose that a lithium-ion rechargeable battery has a maximum capacity of $C_{max}$, a battery voltage of X, in this particular example, $4.2V \geq X \geq 3V$, and the rechargeable battery can be recharged through a current I, which may become a constant current $I_c$ when X reaches a threshold of $X_c=4.2V$. The recharging process can be characterized as:

X at time t=0 s is $X_1=3.9V$;
X at time t=30 mins (T) is $X_2=3.91V$; and
I=1 A at t=0 min.

According to the above example, the capacity C of the rechargeable battery varies over time. Denoting the capacity of the rechargeable battery as $C_{n\%}$ where n is 1 to 100 when that capacity is n % of $C_{max}$, when X=3.8V, $C=C_{5\%}=0.05\ C_{max}$, and when X is approaching 4.2V, $C=C_{85\%}=0.85\ C_{max}$. When $I=I_c=50$ mA, the central processing circuitry 3 is programmed to stop the substantive charging process because the rechargeable battery is deemed to be fully charged.

$C_{85\%}$ can be obtained by the following expression:

$$C_{85\%} = \frac{4.2-3.8}{X_2-X_1} \cdot I \cdot \frac{T}{3600} \cdot \frac{100}{80}$$
$$= \frac{4.2-3.8}{3.91-3.9} \cdot 1 \cdot \frac{30}{3600} \cdot \frac{100}{80}$$
$$= 4.17\ Ah$$

The time it takes for the rechargeable battery to obtain 80% of the maximum capacity can be calculated as follows:

$$t_{80\%} = \frac{4.2-X_2}{X_2-X_1} \cdot \frac{T}{3600}$$
$$= \frac{4.2-3.91}{3.91-3.9} \cdot \frac{30}{3600}$$
$$= 14.5\ mins$$

The time it takes for the charging current to reach 50 mA after $C_{80\%}$ has been reached can be calculated by:

$$t_{50mA} = \frac{C_{85\%} \cdot 15\%}{I \cdot 15\%} \cdot 60$$
$$= \frac{0.417 \cdot 15\%}{1 \cdot 15\%}$$
$$= 25.02 \, mins$$

The total charging time is therefore 14.5 mins+25.02 mins=39.52 mins.

As a second example, when I=0.5 A (II) as the initial charging current, $t_{80\%}$ can be obtained by:

$$t_{80\%} = \frac{4.2 - X_2}{X_2 - X_1} \cdot \frac{I}{I_1} \cdot \frac{T}{60}$$
$$= \frac{4.2 - 3.91}{3.91 - 3.9} \cdot \frac{1}{0.5} \cdot \frac{30}{60}$$
$$= 29 \, mins$$

$$t_{50mA} = \frac{C_{85\%} \cdot 15\%}{I_1 \cdot 15\%} \cdot 60$$
$$= \frac{0.417 \cdot 15\%}{0.5 \cdot 15\%}$$
$$= 50.04 \, mins$$

The total recharging time is therefore 29mins+50.04mins=79.04mins.

It is also worth mentioning that the multi-battery charger is adapted to recharge rechargeable battery containing one or two battery units. Moreover, when the rechargeable battery has fully been recharged, the central processing unit 3 is adapted to deactivate the recharging circuitry 7 and at the same time activate the display unit 8 to show a corresponding message signaling the user of the present invention to take away the rechargeable battery from the charger case 100.

From the above descriptions, it can also be seen that the present invention also provides a method of charging a rechargeable battery by a multi-battery charger comprising a plurality of charging terminals 600, a recharging circuitry 7, a central processing module 3, wherein the rechargeable battery has a first and a second battery terminal but unknown polarity, wherein the method comprises the steps of:

(a) electrically connecting one of the charging terminals 600 and another of said charging terminals 600 with a first battery terminal and a second battery terminal respectively, wherein the charging terminal 600 electrically which connects to said first battery terminal is defined as a reference charging terminal 600, and the charging terminal 600 which electrically connects to the another of the charging terminals 600 is defined as a tester charging terminal 600;

(b) electrically connecting the reference charging terminal 600 with a negative terminal of the recharging circuitry 7;

(c) electrically connecting the tester charging terminal 600 with a positive terminal for the recharging circuitry 7;

(d) starting a tester charging process by the central processing module 3 for acquiring a recharging voltage pattern;

(e) comparing the recharging voltage pattern with a reference voltage pattern; and (f) starting a substantive recharge process when the recharging voltage pattern substantially resembles the reference voltage pattern so as to fully recharge the rechargeable battery by the recharging circuitry 7; and (g) electrically re-connecting the charging terminals 600 with the recharging circuitry 7 when the recharging voltage pattern departs substantially from the reference voltage pattern.

Step (d) comprises the steps of:

(d.1) monitoring a charging current of the rechargeable battery by a current monitoring circuitry 11; and (d.2) monitoring a change of battery voltage of the rechargeable battery by the central processing circuitry 3, wherein the recharging voltage pattern is obtained by observing the change of recharging current with respect to the battery voltage, in such a manner that when the rechargeable battery is properly recharged in correct polarity, a gradual increase in battery voltage with gradual decrease in charging current is observed as the reference voltage pattern.

Step (g) comprises the steps of:

(g.1) electrically disconnecting the positive terminal of the recharging circuitry 7 from the second charging terminal;

(g.2) electrically connecting the positive terminal of the recharging circuitry with one of the remaining charging terminals which has not been electrically connected for the tester charging process;

(g.3) re-starting the tester charging process by the central processing module 3 for acquiring a corresponding recharging voltage pattern;

(g.4) re-starting the substantive recharge process when the corresponding recharging voltage pattern substantially resembles the reference voltage pattern so as to fully recharge the rechargeable battery by the recharging circuitry 7;

(g.5) restarting step (g.1) to step (g.4) when the corresponding recharging voltage pattern departs substantially from the reference voltage pattern, until the corresponding recharging voltage pattern substantially resembles the reference voltage pattern, wherein when the corresponding recharging voltage pattern substantially resembles the reference voltage pattern, re-performing step (f).

Step (g) further comprises the step of:

(g.6) when the recharging voltage pattern does not match the reference voltage pattern for all of said charging terminals, electrically disconnecting the negative terminal of the recharging circuitry 7 from the charging terminal 600 being regarded as a reference charging terminal 600, and the positive terminal of the recharging circuitry 7 from the charging terminal 600 being regarded as the tester charging terminal 600; and (g.7) electrically connecting the negative terminal of the recharging circuitry 7 to one of the charging terminals 600 except the first charging terminal 600 as a new reference charging terminal, and electrically connecting the negative terminal of the recharging circuitry 7 to one of the charging terminals 600 except the second charging terminal 600 as a new tester charging terminal 600 and re-performing step (d) through step (g) until the recharging voltage pattern resembles the reference voltage pattern.

One skilled in the art will appreciate that the embodiment of the present invention as shown in the drawings and described above is illustrative only and not intended to be limiting. All embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A multi-battery charger for at least one rechargeable battery having a first and a second battery terminal, comprising:

a charger case comprising at least three electrically neutral charging terminals as spacedly provided thereon as multi-contact terminals of said charger case, and an electric input terminal adapted for electrically connecting with an external DC power source; and a multi-battery charging module, which is provided in said charger case to electrically communicate with said electrically neutral charging terminals, and comprises:

a recharging circuitry having a positive recharge terminal and a negative recharge terminal adapted for electrically connecting with said battery terminals in correct polarity through said charging terminals for properly recharging said rechargeable battery; and a polarity detection circuitry electrically connected with said recharging circuitry to accurately detect a positive polarity and a negative polarity of said first and said second battery terminal when said first and said second battery terminals are electrically connected with at least two of said charging terminals, in such a manner that when a correct polarity of said first and said second battery terminals is determined, said recharging circuitry is activated to properly recharge said rechargeable battery, wherein said recharging circuitry is adapted for electrically connecting to said first battery terminal and said second battery terminal through said charging terminals for recharging said rechargeable battery, in such a manner that when said battery is properly recharged, a potential difference between said positive recharge terminal and said negative recharge terminal follows a predetermined reference voltage pattern, wherein said polarity detection circuitry comprises a central processing module electrically communicated with said recharging circuitry to control and monitor an operation thereof; and a terminal rerouting circuitry electrically communicating between said recharging circuitry and said central processing module, in such a manner that when said first and said second battery terminals are electrically connected with said charging terminals, said terminal rerouting circuitry electrically connects one of said charging terminals to said negative recharge terminal of said recharging circuitry, and another of said charging terminals to said positive recharge terminal of said recharging circuitry for attempting recharging of said battery by said recharging circuitry and producing a recharging voltage pattern between said positive and said negative recharging terminal, wherein when said recharging voltage pattern substantially departs from said predetermined reference voltage pattern, said terminal rerouting circuitry is electrically controlled by said central processing module to electrically reconnect said charging terminals with said negative and said positive recharge terminals of said recharging circuitry, until said predetermined reference voltage patterns occurs in said recharging circuitry so as to ensure that said battery is properly recharged in correct polarity.

2. The multi-battery charger, as recited in claim 1, wherein said terminal rerouting circuitry comprises a negative connection circuitry electrically connected with said charging terminals and said central processing module, and a positive connection circuitry electrically connected with said charging terminals and said central processing module, wherein said negative terminal of said recharging circuitry is electrically connected to said negative connection circuitry, while said positive terminal of said recharging circuitry is electrically connected with said positive connection circuitry in such a manner that said positive connection circuitry and said negative connection circuitry facilitate electrical reconnection of said charging terminals with said recharging circuitry when said recharging voltage pattern substantially departs from said reference voltage pattern.

3. The multi-battery charger, as recited in claim 2, wherein said multi-battery charging module further comprises a current monitoring circuitry electrically connected with said negative terminal of said recharging circuitry and said central processing unit for detecting a charging current of said rechargeable battery when said rechargeable battery is recharged by said recharging circuitry, wherein said charging current is utilized to assess said charging voltage pattern of said rechargeable battery.

4. The multi-battery charger, as recited in claim 3, wherein said central processing module is programmed to monitor a change of a battery voltage of said rechargeable battery, wherein said change of said battery voltage is combined with said charging current to form said recharging voltage pattern which is utilized to compare with said reference voltage pattern for confirming proper recharge of said rechargeable battery.

5. The multi-battery charger, as recited in claim 3, wherein said multi-battery charging module further comprises a charging terminal circuitry electrically connecting said charging terminals of said charger case with said central processing module for transmitting electrical signal to said rechargeable battery for recharging thereof, and an activation control circuitry electrically connected to said central processing module for detecting presence of said rechargeable battery, and activating said central processing module to recharge said rechargeable battery when said rechargeable battery is electrically connecting with said charging terminals for recharging said rechargeable battery.

6. The multi-battery charger, as recited in claim 4, wherein said multi-battery charging module further comprises a charging terminal circuitry electrically connecting said charging terminals of said charger case with said central processing module for transmitting electrical signal to said rechargeable battery for recharging thereof, and an activation control circuitry electrically connected to said central processing module for detecting presence of said rechargeable battery, and activating said central processing module to recharge said rechargeable battery when said rechargeable battery is electrically connecting with said charging terminals for recharging said rechargeable battery.

7. The multi-battery charger, as recited in claim 5, wherein said charger case further has a receiving cavity indently formed therein, a top opening communicating said receiving cavity with an exterior of said charger case, and a plurality of adjustable battery compartments formed on said receiving cavity of said charger case to fittedly receive said rechargeable battery, wherein said charging terminals are spacedly provided on said battery compartments to electrically connect with said polarity detection circuitry.

8. The multi-battery charger, as recited in claim 6, wherein said charger case further has a receiving cavity indently formed therein, a top opening communicating said receiving cavity with an exterior of said charger case, and a plurality of adjustable battery compartments formed on said receiving cavity of said charger case to fittedly receive said rechargeable battery, wherein said charging terminals are spacedly provided on said battery compartments to electrically connect with said polarity detection circuitry.

9. The multi-battery charger, as recited in claim 8, wherein said charger case further has a plurality of sliding tracks formed along two longitudinal inner side surfaces of said receiving cavity, and comprises an adjustment slider slidably coupled with said sliding tracks in said receiving cavity to divide said receiving cavity into a plurality of said adjustable battery compartments for receiving at least one rechargeable battery therein.

10. The multi-battery charger, as recited in claim 9, wherein said adjustment slider has a plurality of L-shaped retention shoulders formed on two top corner portions thereof respectively for facilitating fit accommodation of said rechargeable battery into said corresponding battery compartment.

11. A method of charging a rechargeable battery by a multi-battery charger comprising a plurality of charging terminals, a recharging circuitry, and a central processing module, wherein the rechargeable battery has a first and a second battery terminal but unknown polarity, wherein the method comprises the steps of:

(a) electrically connecting one of said charging terminals and another of said charging terminals with said first battery terminal and said second battery terminal respectively, wherein said charging terminal electrically which connects to said first battery terminal is defined as a reference charging terminal, and said charging terminal which electrically connects to said another of said charging terminals is defined as a tester charging terminal;

(b) electrically connecting said reference charging terminal with a negative terminal of said recharging circuitry;

(c) electrically connecting said tester charging terminal with a positive terminal for said recharging circuitry;

(d) starting a tester charging process by said central processing module for acquiring a recharging voltage pattern;

(e) comparing said recharging voltage pattern with a reference voltage pattern;

(f) starting a substantive recharge process when said recharging voltage pattern substantially resembles said reference voltage pattern so as to fully recharge said rechargeable battery by said recharging circuitry; and (g) electrically re-connecting said charging terminals with said recharging circuitry when said recharging voltage pattern departs substantially from said reference voltage pattern.

12. The method, as recited in claim 11, wherein said step (d) comprises the steps of:

(d.1) monitoring a charging current of said rechargeable battery by a current monitoring circuitry of said multi-battery charger; and (d.2) monitoring a change of battery voltage of said rechargeable battery by said central processing circuitry, wherein said recharging voltage pattern is obtained by observing said change of said charging current with respect to said battery voltage, in such a manner that when said rechargeable battery is properly recharged in correct polarity, a gradual increase in said battery voltage with gradual decrease in said charging current is observed as said reference voltage pattern.

13. The method, as recited in claim 11, wherein said step (g) comprises the steps of:

(g.1) electrically disconnecting said positive terminal of said recharging circuitry from said second charging terminal;

(g.2) electrically connecting said positive terminal of said recharging circuitry with one of said remaining charging terminals which has not been electrically connected for said tester charging process;

(g.3) re-starting said tester charging process by said central processing module for acquiring a corresponding said recharging voltage pattern;

(g.4) re-starting said substantive recharge process when said corresponding recharging voltage pattern substantially resembles said reference voltage pattern so as to fully recharge said rechargeable battery by said recharging circuitry; and (g.5) restarting said step (g.1) to said step (g.4) when said corresponding recharging voltage pattern departs substantially from said reference voltage pattern, until said corresponding recharging voltage pattern substantially resembles said reference voltage pattern, wherein when said corresponding recharging voltage pattern substantially resembles said reference voltage pattern, re-performing said step (f).

14. The method, as recited in claim 12, wherein said step (g) comprises the steps of:

(g.1) electrically disconnecting said positive terminal of said recharging circuitry from said second charging terminal;

(g.2) electrically connecting said positive terminal of said recharging circuitry with one of said remaining charging terminals which has not been electrically connected for said tester charging process;

(g.3) re-starting said tester charging process by said central processing module for acquiring a corresponding said recharging voltage pattern;

(g.4) re-starting said substantive recharge process when said corresponding recharging voltage pattern substantially resembles said reference voltage pattern so as to fully recharge said rechargeable battery by said recharging circuitry; and (g.5) restarting said step (g.1) to said step (g.4) when said corresponding recharging voltage pattern departs substantially from said reference voltage pattern, until said corresponding recharging voltage pattern substantially resembles said reference voltage pattern, wherein when said corresponding recharging voltage pattern substantially resembles said reference voltage pattern, re-performing said step (f).

15. The method, as recited in claim 13, wherein said step (g) further comprises the step of:

(g.6) when said recharging voltage pattern does not match said reference voltage pattern for all of said charging terminals, electrically disconnecting said negative terminal of said recharging circuitry from said charging terminal which is regarded as said reference charging terminal, and electrically disconnecting said positive terminal of said recharging circuitry from said charging terminal which is regarded as said tester charging terminal; and (g.7) electrically connecting said negative terminal of said recharging circuitry to one of said charging terminals except said first charging terminal as a new said reference charging terminal, and electrically connecting said negative terminal of said recharging circuitry to one of said charging terminals except said second charging terminal as said new tester charging terminal, and re-performing said step (d) through said step (g) until said recharging voltage pattern resembles said reference voltage pattern.

16. The method, as recited in claim 14, wherein said step (g) further comprises the step of:

(g.6) when said recharging voltage pattern does not match said reference voltage pattern for all of said charging terminals, electrically disconnecting said negative terminal of said recharging circuitry from said charging terminal which is regarded as said reference charging terminal, and electrically disconnecting said positive terminal of said recharging circuitry from said charging terminal which is regarded as said tester charging terminal; and (g.7) electrically connecting said negative terminal of said recharging circuitry to one of said charging terminals except said first charging terminal as a new said reference charging terminal, and electrically connecting said negative terminal of said recharging circuitry to one of said charging terminals except said second charging terminal as said new tester charging terminal, and re-performing said step (d) through said step (g) until said recharging voltage pattern resembles said reference voltage pattern.

\* \* \* \* \*